(12) United States Patent
Patel et al.

(10) Patent No.: US 7,826,830 B1
(45) Date of Patent: Nov. 2, 2010

(54) LOCATION-ENABLED PRESENCE FOR MOBILE IM

(75) Inventors: Biren Patel, Fremont, CA (US); Yan Xue, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 815 days.

(21) Appl. No.: 11/704,919

(22) Filed: Feb. 12, 2007

(51) Int. Cl.
H04M 3/42 (2006.01)

(52) U.S. Cl. .............. 455/414.1; 455/414.2; 455/414.3; 455/414.4; 455/456.1

(58) Field of Classification Search .............. 455/456.1, 455/456.2, 456.3, 456.6, 457, 404.2, 414.2, 455/414.3, 414.4
See application file for complete search history.

(56) References Cited

U.S. PATENT DOCUMENTS

| | | | |
|---|---|---|---|
| 6,788,249 B1 * | 9/2004 | Farmer et al. | 342/357.12 |
| 7,120,455 B1 | 10/2006 | Chen et al. | |
| 2002/0035605 A1 * | 3/2002 | McDowell et al. | 709/206 |
| 2002/0077080 A1 * | 6/2002 | Greene | 455/412 |
| 2002/0126701 A1 | 9/2002 | Requena | |
| 2002/0149516 A1 * | 10/2002 | Vayanos et al. | 342/357.06 |
| 2004/0023670 A1 * | 2/2004 | Merheb | 455/456.1 |
| 2005/0066044 A1 * | 3/2005 | Chaskar et al. | 709/230 |
| 2005/0260993 A1 | 11/2005 | Lovell, Jr. | |
| 2006/0014552 A1 * | 1/2006 | Cunningham et al. | 455/466 |
| 2006/0030339 A1 * | 2/2006 | Zhovnirovsky et al. | 455/456.6 |

OTHER PUBLICATIONS

Yanna Vogiazou, Wireless Presence and Instant Messaging, JISC Report, The Open University, 2002.*

* cited by examiner

*Primary Examiner*—Patrick N Edouard
*Assistant Examiner*—Dung Hong
(74) *Attorney, Agent, or Firm*—McDermott Will & Emery LLP

(57) ABSTRACT

Instant messaging (IM) users in a wireless network are allowed to automatically set their presence status based on their geographical location. A conventional Mobile IM (MIM) client, such as a Brew application, allows an IM user to set his presence status, e.g. "Online," "Away," etc. This status is transmitted to the IM server which then publishes this status to other IM users. As disclosed herein, location based presence populates the device position automatically into the presence status or other IM communications. For example, selection of a menu choice <My Location> causes the disclosed MIM client to insert the street address of the current location into the presence status. The disclosed client obtains the location information by working with elements of a location based service (LBS) platform of a wireless mobile communication network, such as a location proxy server (LPS) and a position determining entity (PDE).

5 Claims, 4 Drawing Sheets

LOCATION-ENABLED PRESENCE FOR MOBILE IM

TECHNICAL FIELD

The present subject matter relates to techniques and equipment to enable mobile instant messaging users to automatically add information regarding their geographical location to instant message communication, using information obtained via a wireless communications network.

BACKGROUND

Instant Messaging (IM) is an increasingly popular form of communication. IM allows near real-time exchange of text or other media type messages between users. IM allows a user to maintain a buddy or contact list, listing people with whom the user might exchange instant messages. The user selects a person from the list that is currently logged-in with respect to the IM service and establishes a data communication session with a remote device being used by the selected person. In a personal computer type implementation, the IM software on the user's device opens a window on the computer display. Typically, the window includes two parts, each of which provides a slightly different functionality. One part of the window allows the user to type messages for transmission to the remote user device, whereas the other part receives messages from the remote user device and displays those messages to this user. The remote user's device will provide similar input and display functions, and in this way, both users can read what the other has typed. Originally developed for communications between users of personal computers (PCs) via the Internet, IM services have been expanded to provide similar service to mobile users of wireless communication devices.

Although there are a number of different approaches, IM services typically offer a mechanism to monitor presence of the users on the network, that is to say availability for IM communications. In most IM services, each IM user has a contact list. If a user has a person in his or her contact list, the user also appears in the contact list of the other person. Each user logs-in with a server to indicate presence and provide necessary information for routing messages to the user's communication device, and the server provides notice to other IM users based on the contact list(s). Mobile instant messaging (MIM) services distribute presence status information of users of mobile stations in a similar fashion.

For example, U.S. Pat. No. 7,120,455 to Chen et al. discloses a technique for exchanging messages between a mobile device and a plurality of IM services, and in so doing provides a background description of an implementation of IM service for mobile station users. The user can subscribe to presence updates, which include presence information for at least one contact on the user's contact list. As IM users log in and out of IM service, one or more IM community servers send presence updates to an IM gateway of the mobile network. When the mobile user logs in, or from time to time thereafter, the IM Gateway sends any updates for parties on the MIM user's contact list that it has available for delivery to the MIM client in the user's mobile station. The client receives the updates and can refresh the contact list with updated presence information of the other IM users on the MIM user's contact list.

Also, IM services have provided enhanced notice that allows users to distribute additional information with the presence notifications. In an available example of MIM service, the user has the choice of selecting a canned status or manually entering a status text. For example, "At Home", "At Work" or "At 2785 Mitchell Drive;" and the selected text would be provided to the other parties on the user's contact list. In this way, the other parties would know not only that the user was on-line but that he or she was currently at the location indicated in the text. However, such use of a canned or manually entered status text places the burden on the user to enter the custom text and to determine the address of the location. This is particularly burdensome in the context of a mobile IM user, where typing long text on the mobile device is a daunting task to the average user. These disadvantages could lead to wrong information being displayed to all his or her contacts. Also, by definition, the user is mobile, and the location information may change frequently and require frequent inconvenient re-entry by the user.

The mobile telecom industry has been developing a number of technologies to locate mobile stations, both for emergency services (e.g. 911) and for location based applications. In an increasingly common network implementation, the mobile station has the capability to take Global Positioning System (GPS) measurements and communicate those measurements to one or more network elements for processing, depending on the particular application. Typically, a position determining entity (PDE) communicates with a GPS equipped mobile station (MS) to determine the location of the MS, and for non-emergency services, a Location Proxy Server (LPS) makes that information accessible to various user applications, including some applications that reside on mobile stations.

Hence, mobile networks exist today that provide both IM service, including presence notification service, as well as other services that utilize the PDE and GPS mobile stations to provide various location based services. United States Patent Application Publication No. 20020035605 to McDowell et al., for example, discloses an integrated platform providing presence service, IM service and location based service. However, that publication concentrates on application of the various services for ecommerce, real-time information distribution and network optimization; and does not specifically address the need for automatically integrating the mobile station location information into the presence notifications associated with the IM service itself.

Hence a need still exists for an automatic way to enter mobile user location information for IM service purposes, e.g. for distribution to parties on the user's IM contact list, with little or no involvement by the user. It would also be advantageous if the location data could be dynamically updated as the user roams.

SUMMARY

The teachings herein provide improvement over the art discussed above and alleviate one or more of the above noted problems with providing user location information in the context of an IM service. Techniques, software and equipment are disclosed that automatically determine the current location of an IM user's mobile station and populate information based on that location, such as the text address of the location, into an IM communication.

For example, a method of automatically adding location information to instant messaging discussed below involves determining geographic coordinates of a current location of a mobile station. Information regarding the current location of the mobile station, based at least in part on the geographic coordinates, is automatically populated into an instant messaging communication. The instant message communication, including the location information, is transmitted from the mobile station through a mobile wireless communication network.

In a specific example, the mobile station sends an authentication request through the mobile wireless communication network to a location proxy server (LPS). The mobile station receives a communication from the location proxy server, responsive to the request, which contains a network address of a position determining entity (PDE). The mobile station uses the network address to communicate with the PDE through the mobile wireless communication network, for example, to obtain assistance information. Using the assistance information, a determination is made of the geographic coordinates of a current location of the mobile station. The mobile station transmits the geographic coordinates to the LPS, and in return, the mobile station receives a text address for the current location of the mobile station corresponding to the geographic coordinates. The mobile station automatically populates the received text address into a message for an instant messaging service and transmits the message through the mobile wireless communication network.

In a typical implementation, the coordinates are determined using GPS. For example, using the assistance information, the mobile station takes pseudorange measurements of signals from GPS satellites; and the mobile station and/or the PDE processes the results of the pseudorange measurements to compute the latitude and longitude of the current location of the mobile station. A GIS module in the LPS can then translate the latitude and longitude into a street address or other form of address for the current location and provide that address back to the mobile station.

The mobile station can automatically add the coordinates or location address to a communication related to the IM service. For example, the mobile station's mobile instant messaging (MIM) client can add the address to a presence status message and send the message to the portal for the IM service, e.g. for distribution to other IM users as appropriate. As another example, the MIM client can add the location address or coordinates to an actual instant message that is to be forwarded to another user.

By retrieving the location from the LPS and the PDE, the user gets the accurate information regarding the current location of his device. By populating the location automatically in presence status or other message, no typing on the mobile device is required.

Client software is disclosed for implementing these methods. As noted, the present teachings also encompass equipment, such as a mobile station configured to implement the enhanced IM processing.

As an example, a mobile station might include a wireless transceiver for sending and receiving packet data over an airlink to and from the mobile wireless communication network; a user input and a display, for providing a user interface; and a programmable controller. The controller is coupled to the user input, the display and the wireless transceiver, for controlling operations of the transceiver and interacting with a user via the user interface. The mobile station also includes a program memory storing programming for execution by the programmable controller. A mobile instant messaging client program is stored in the program memory. Execution of the mobile instant messaging client program causes the controller to operate the mobile station to perform several functions. Such operations include determining geographic coordinates of a current location of a mobile station. The mobile station automatically populates information regarding the current location of the mobile station, based at least in part on the geographic coordinates, into an instant messaging communication. The mobile station transmits the instant message communication, with the location information, through the mobile wireless communication network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Techniques, software and equipment are disclosed that automatically determine the current location of an IM user's mobile station and populate information based on that location, such as the text address of the location, into an IM communication. IM users in a wireless network are allowed to automatically set their presence status based on their geographical location. As disclosed herein, a location based presence function of the MIM client automatically populates the device position into the presence status or other IM communications. For example, selection of a menu choice <My Location> causes the MIM client to insert the street address of the current location into the presence status, which is forwarded to the IM portal server for distribution to other users. The MIM client obtains the location information by working with elements of a location based service (LBS) platform of the mobile wireless communication network, such as a location proxy server (LPS) and a position determining entity (PDE).

Figure 1:
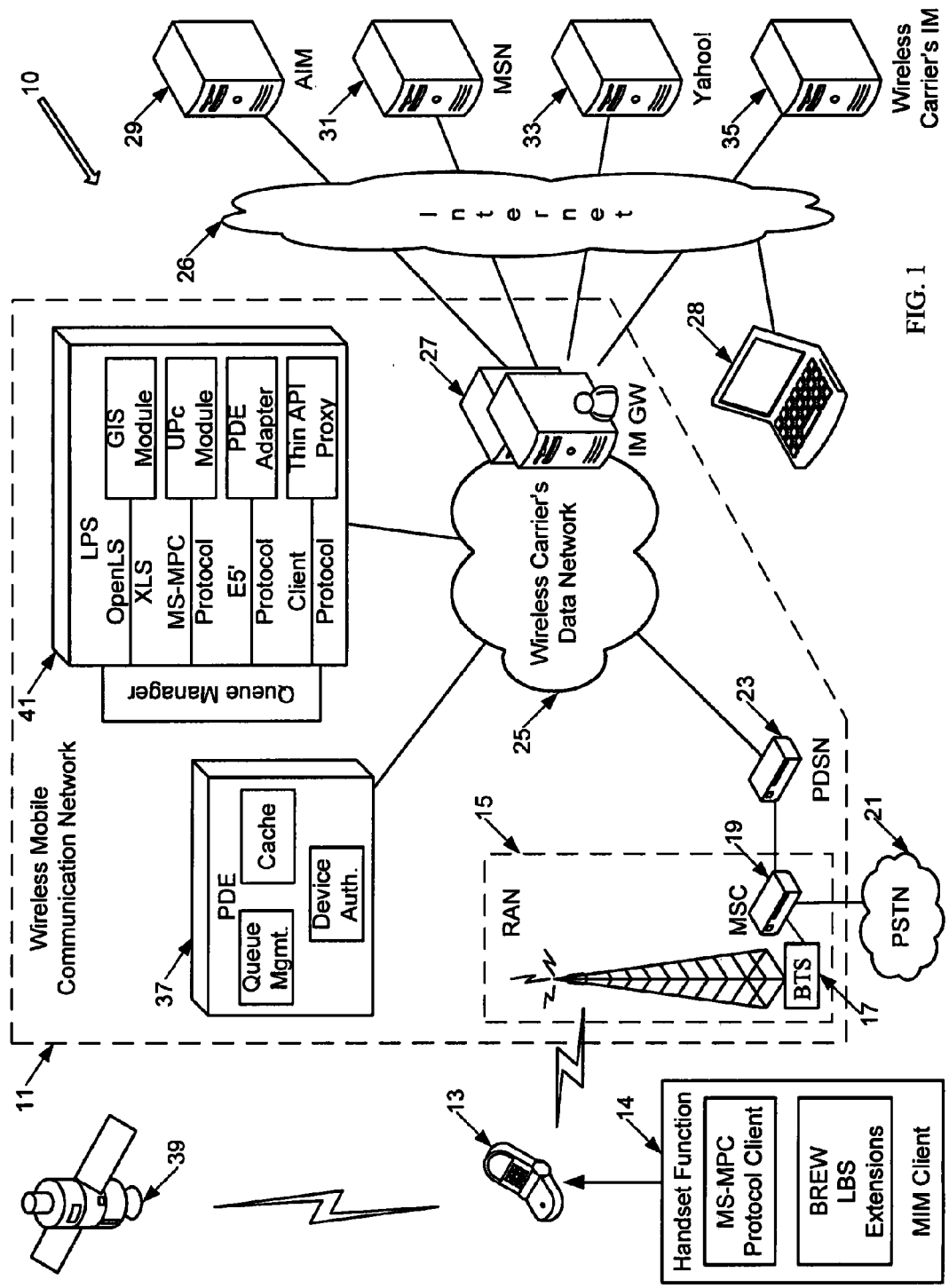
FIG. 1 is a simplified functional block diagram of a system for providing mobile IM service, location based services, and enhancement of presence notifications for the IM service with mobile station location information.

Reference now is made in detail to the examples illustrated in the accompanying drawings and discussed below. FIG. 1 provides a high-level functional illustration of an overall communication system 10 offering mobile communication services, including IM and location based service (LBS). The communication system 10 includes a mobile wireless communication network 11, operated by one or more service providers or "carriers." Although the present concepts are applicable to other network architectures, for this discussion, it is assumed that the wireless communication network 11 is a public cellular telephone network of the type represented in high level functional block diagram form in FIG. 1.

The wireless mobile communication network 11 provides mobile communication services to a number of mobile stations of various types, one of which is represented by way of example as a handset type mobile station 13 in the drawing. A public cellular telephone type network typically offers an array of voice telephone services and packet data communication services to users of the mobile stations 13.

The wireless mobile communication network 11 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications that offer the packet data transport used for instant messaging (IM). The mobile stations 13 may be capable of conventional voice telephone communications. However, for IM, the mobile stations 13 have IP packet data communication capabilities, and the wireless communication network 11 provides wireless IP packet communications to and from each of the mobile stations 13. A variety of different types of mobile stations supporting such communications are widely available. Those skilled in the art should be familiar with the general structure and operation, both of the mobile stations and the wireless networks, therefore a relatively high-level description thereof is provided here.

The mobile station 13 will be programmed to implement a variety of functions, in a manner discussed later. Of note for purposes of this discussion, the mobile station 13 will run one or more programs forming a Mobile IM (MIM) client 14. In the example, the MIM client 14 includes a MS-MPC (Mobile Station-Mobile Positioning Center) protocol client, for interaction with network elements to determine mobile station position. The MIM client 14 will also include client programming for the IM application functions, in this implementation, in the form of a BREW (Binary Runtime Environment for Wireless) application, for example, as a location based service (LBS) extension. The MIM client 14 will serve to control mobile station operations to determine location, obtain information related to location, and populate the location information into one or more IM communications, in an automatic manner. The MIM client 14 will also control the mobile station to implement user interface functions in relation to the IM application, including those related to the location functionality.

The wireless mobile communication network 11 typically includes a number of radio access networks, serving various regions. Physical elements of a radio access network (RAN) 15 include a number of base stations, one of which is represented in the example by the base transceiver system (BTS) 17 and the associated antennae system. The BTS 17 communicates via the antenna(s) at the site of base station and thus over the air-link with one or more of the mobile stations 13, when the mobile stations are within range. In this way, the base station provides wireless communication service over a coverage area often referred to as a "cell."

The RAN 15 also includes a traffic network, which carries the user communications for the mobile stations 13. In a 1xRTT or similar implementation, for example, the RAN 15 includes a number of radio access network switches, typically modern versions of mobile switching centers, represented in the drawing by the MSC 19. The MSC 19 supports both cellular voice communications, e.g. to other mobile stations and/or through the public switched telephone network (PSTN) 21, as well as packet data services for IM and other applications. Each such MSC switch 19 connects through trunk circuits (not shown) to a number of the BTS base station transceivers 17, which the respective MSC 19 serves and controls.

The wireless communication network 11 also includes a number of Packet Data Serving Nodes, represented in the drawing by the PDSN 23. The PDSN connects to the traffic network portion of the RAN 15, for example, via the MSC 19; and it connects to the wireless carrier's packet data network 25. The PDSN 23 is a fixed network element introduced in the architectures for 3g wireless networks, to support packet-switched data services. Each PDSN 23 establishes, maintains and terminates logical links to the associated portion of the RAN 15. The PDSN 23 also supports point-to-point (PPP) user data sessions with the mobile stations 15, for various applications that utilize packet data transport, such as IM. The PDSNs provide the packet routing function from the radio network to/from the carrier's private data network 25.

The packet transport, for example, may provide access to the Internet 26, for e-mail, web browsing and a variety of other applications. For purposes of the present discussion, the packet transport through the RAN 15, the PDSN 23 and the data network 25 also provides transport for IM services for the mobile stations 13.

The carrier also operates or provides access through the data network 25 to a gateway server 27, to support IM type services for its subscribers. The gateway 27 provides the primary interface between the network 11 and various IM portals and the like, for IM services that the carrier supports by providing message transport for its IM subscribers (users of mobile stations 13). Typically, the gateway server 27 provides a connection to the Internet 26 or other network that provides packet data transport to/from the server platforms of the respective portals and for transport of IM messages to users that are not on the network 11, such as a user of the PC 28.

For general illustration and discussion purposes, the drawing shows four IM portals, 29-35, connected to the Internet 26. The first three IM portals 29, 31 and 33 represent portals of public commercial IM service providers, such as AIM™, MSN™ and Yahoo™. The wireless carrier may also operate its own portal 35 and offer its own branded IM service to its subscribers.

For a given IM service to which the user of the mobile station 13 subscribes, presence information is exchanged between the mobile station 13 and the server computer operating as the particular IM portal. For example, if the user subscribes to the carrier's service, the mobile station 13 will send its presence status information through the network 11, the gateway 27 and the Internet 26, to the carrier's IM portal 35. For other mobile IM parties who use that service who are on the user's list or that have the user on their own contact or buddy list, the carrier's IM portal 35 will send presence update information through the Internet 26 to the IM gateway 27 and through the network 11 to the mobile station 13. For other subscribers to the particular IM service, the IM portal 35 will send presence update information through the Internet 26, for example, to the PC 28. Actual exchanges of IM messages may go through the particular portal, or messages may be exchanged in a peer-to-peer manner through the networks, depending on the IM implementation for the particular service. At a high level, these IM communications are similar to those used in existing services where some of the subscribers use mobile stations 13. However, as taught here, the presence status information and possibly other IM communications for the mobile user are automatically enhanced with information about the current location of the mobile station 13 and thus the current location of that station's IM user.

The network 11 is also configured to perform position or location determinations with respect to mobile stations 13 and to provide location based services based on determinations of positions of the mobile stations 13. The equipment for providing such location based services is used here to enhance location information in the context of mobile IM. Before discussing the specific use in mobile IM, it may be helpful first to consider more general aspects of the network elements used to support location based services for users of mobile stations 13.

For determining mobile station locations, the network 11 includes one or more Position Determining Entities (PDEs) 37. The PDE 37 is a network element that manages the position or geographic location determination of each mobile station 15. The exemplary network 11 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13.

The PDE system 37 is essentially a general purpose programmable device with an interface for data communication via the network 25 running server software and running programming for implementation of the PDE functions, such a device authentication, data cache and processing queue management. The PDE 37 stores (e.g. in cache memory) or has access to a complete and up to date set of the satellite data for the constellation of GPS satellites 39 needed to allow computation of position based on pseudorange measurements from satellite signals. The data may include that associated with the entire constellation but will at least include the data for the satellites expected to be broadcasting into the geographic region serviced by the network 11.

When a mobile station 13 attempts a GPS position fix, the mobile station 13 provides information allowing the PDE 37 to perform a pre-fix. Typically, the mobile station 13 will provide data identifying the base station through which it is receiving service (and possibly the serving sector). In some implementations, the PDE may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13. If the mobile station 13 has full GPS computation capability, the station 13 would know its current latitude and longitude and would communicate that data to the PDE 37 through the network 11. In many cases, however, the mobile station 13 has only measurement capability, and the station forwards the measurement data to the PDE 37 to determine the final fix. In either case, the GPS processing leads to a situation in which the PDE 37 knows the latitude and longitude of the mobile station 13. If necessary, the PDE 37 can provide coordinates to the mobile station 13.

For many applications further processing or access is needed. To provide access to general users, e.g. mobile subscribers and authorized third party users, the carrier also operates a location proxy server (LPS) 41. The LPS 41 is essentially a general purpose programmable device with an interface for data communication via the network 25 running server software and running programming for implementation of the LPS functionality. In the example, the server platform runs a queue manager for managing communications and access to the various LPS program modules. The LPS program modules include a thin API proxy client, for client-server proxy communications with the mobile stations 13. The LPS program modules also include a PDE adapter, for E5' protocol type communications through the network 25 with the PDE 37, e.g. for situations in which the LPS 41 needs to obtain mobile station position data from the PDE 37.

For purposes of the present discussion, the LPS program modules also include a user privacy component (UPc) and a Geographic Information System (GIS) component module. The UPc module uses the MS-MPC protocol to communicate through the network with the mobile stations 13. The UPc module manages and enforces subscriber permissions with regard to access to a user's location data, and this module authenticates all applications before allowing location fixes with regard to a mobile station location. The GIS component module provides various location specific information, such as mapping data (maps, roads, points of interest, etc.) and associated coding functions. For the location function related to the mobile IM service, the GIS component provides a translation from the geographic coordinates of the mobile station location into an address, typically a street address, for that location. The GIS component module uses a variant of XML protocol adapted for location services, that is to say the open location service (OpenLS) XLS protocol.

In general, a party or system that needs or desires location information with regard to a mobile station 13 contacts the LPS 41. The LPS authenticates that party and application and provides location related information. For example, a parent may want to know the location of their child's mobile station. As another example, a user of a mobile station may want information about their present location, e.g. to see a map or receive data about businesses or points of interest in the vicinity. For the location function related to the IM service, the LPS 41 directs the mobile station to the PDE 37 for a position fix, and the LPS 41 converts location coordinates to address text data for the mobile station MIM client to use in one or more IM communications through the network 11.

Figure 2:
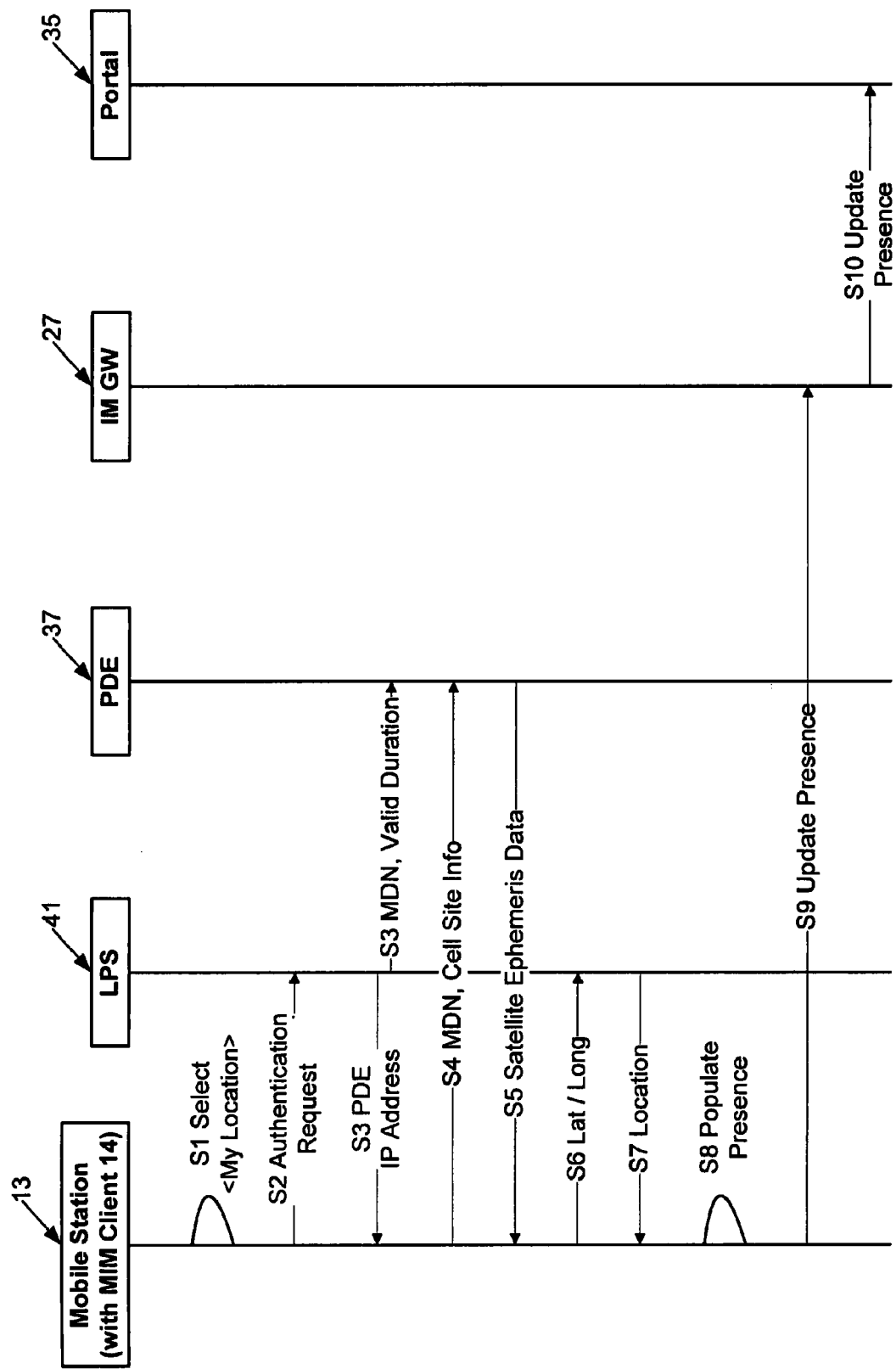
FIG. 2 is a call flow diagram illustrating steps of a procedure for obtaining mobile station location information and forwarding that information as part of an indication of presence status to an IM portal.
Figure 5:
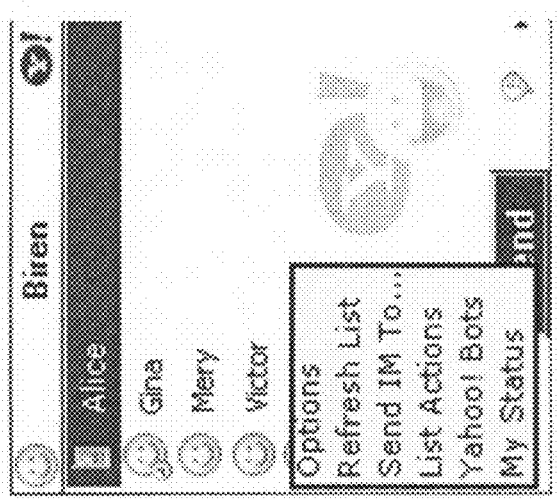
FIG. 5 depicts an example of a progress screen, which may be displayed on the mobile station.

FIG. 2 is a call flow diagram illustrating steps of a procedure for obtaining mobile station location information and forwarding that information in a presence update message to an IM portal. At a high level, the user selects a function relating to location from one or a series of menus provided on the mobile station 13 by the MIM client, such as those shown in FIGS. 2 and 3. The MIM client is authenticated through the LPS 41 after which it obtains GPS assistance data from the PDE 37. The mobile station 13 takes measurements of signals from one or more of the satellites 39, and the PDE 37 and/or the mobile station 13 process the measurement data to determine the position coordinates (latitude, longitude and possibly altitude) of the current location of the mobile station 13. The position coordinates data is sent to the LPS 41, which converts the coordinates to an address for that geographic location, typically a street address. The LPS 41 sends the address back to the mobile station 13. The mobile station may advise the user of the current location, for example by display of a progress screen such as that shown in FIG. 5. The MIM client in the mobile station now generates a presence update message, inserts the address for the user's current location as part of the presence status, and forwards the presence update message through the network 11, the IM gateway 27 and the Internet 26 to the appropriate IM portal. The IM portal in turn distributes presence update notifications, with the user's location address, to other IM users, e.g. users who are on this user's contact list. A more detailed description of the call flow of FIG. 2 is provided, later.

Figure 7:
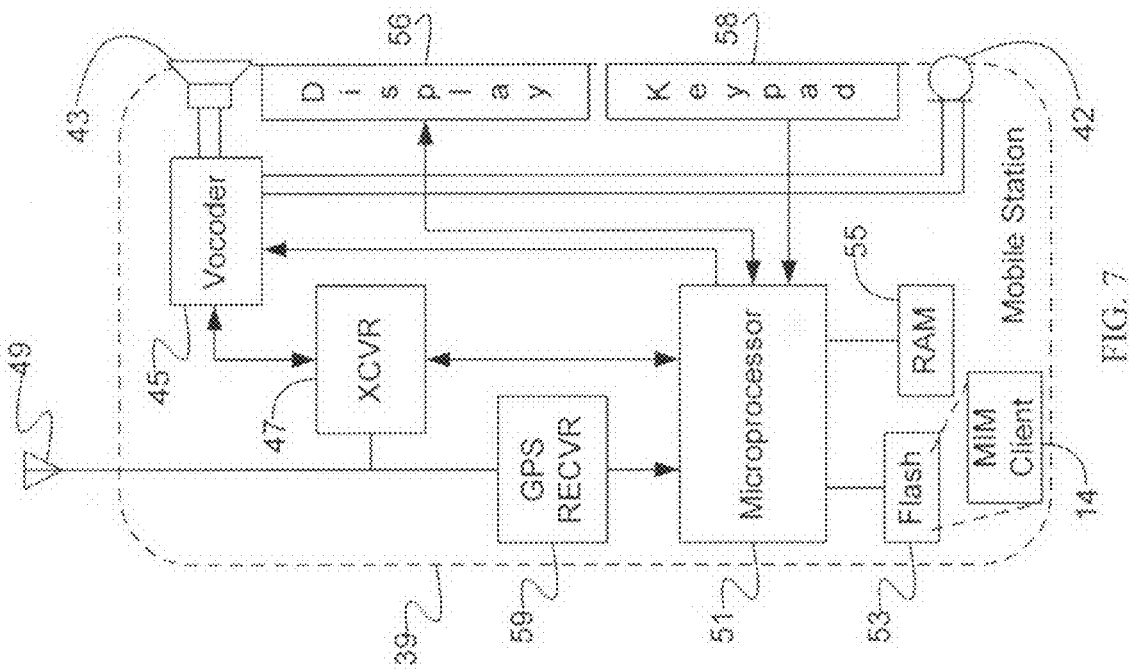
FIG. 7 is a simplified functional block diagram of a mobile station.

It is assumed that those skilled in the art are familiar with the structure and operation of the mobile stations 13. The discussion herein focuses on mobile station position determinations, as assisted through network communications. However, those communications and related IM operations are enhanced to add location information to IM communications, such as the presence information. To insure a full understanding by all readers, it may be helpful to consider a high level summary review of the relevant structure of one example of a mobile station 13. FIG. 7 provides block diagram illustrations of a GPS enabled mobile station 13.

Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a normal digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13 also includes a digital transceiver (XCVR) 47. The concepts discussed here encompass embodiments of the station 13 utilizing any digital transceivers that conform to current or future developed digital wireless communication standards. For example, the transceiver 47 could be an EVDO, TDMA or GSM unit designed for cellular or PCS operation. In the present embodiments, the digital transceiver 47 is a CDMA transceiver compatible with operation via an IS-95 network or a 1x network, to provide both voice and packet data communications for IM and other data applications. Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related to IM as well as acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software.

Of note for purposes of this discussion, the stored program software will also includes a Mobile IM (MIM) client program 14, which may also be configured as a location based service (LBS) application to automatically obtain the station location information from the LPS as discussed above, for insertion in the presence status or other message sent to the IM portal or other IM users. In the implementation of FIG. 1, the location based programming would include the MS-MPC protocol client, for interaction with the LPS and PDE to determine mobile station position as well as BREW extensions for the client program for the IM application. The stored programming may further include other applications relating to GPS based position determination and may include one or more additional location based service applications that utilize determined position information.

The memories 53, 55 also store various data, such as telephone numbers and server addresses and data input by the user. For example, the memory 53 and/or the memory 55 will at various times store coordinates obtained from the GPS processing as well as the location address data received from the LPS 41.

As shown, the digital telephone handset 13 includes a display 56 for displaying messages, menus or the like, call related information dialed by the user, calling party numbers, etc. For the location enhanced IM service, the display 56 provides output of text and/or image information for menus and progress displays likes those of FIGS. 3-5 as well as IM message displays. If the station runs other location based service applications, the display 56 may provide other information regarding the determined location and/or surrounding areas, e.g. LAT/LON data, map displays and possibly displays of information about items of interest in and around the determined location. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections, for the IM application and any other applications relating to determining position and providing ancillary position specific information for a location based service. Of course other user interface elements may be used, such as a stylus and touch sensitive display screen, as in a PDA.

For position determination and associated location based services, the mobile station 13 also includes a GPS receiver 59. Under control of the microprocessor 51, the GPS receiver 59 receives and processes signals from one or more satellites of the constellation 21 of GPS satellites. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing.

The structure and operation of the mobile station 13, as outlined above, were described to by way of example, only. Using a mobile station 13 and the network of FIG. 1, as an example, it may be helpful now to consider the signal or call flow of FIG. 2 in somewhat more detail, as it may prove helpful in understanding steps involved in an exemplary process of determining mobile station location and distributing location information with presence information, in the context of a mobile IM service.

For ease of discussion, it is assumed that the mobile station 13 has already established packet data communication through the network 11 and the user has logged-into one of the IM services via the appropriate portal, 29-35. To reach that point, the user has activated the MIM client application 14 in the mobile station 13 and has interacted through the client program to log-in to the IM service. For this example, we will assume that the user has logged into the IM service provided by the portal 35. Typically, this log-in process between the mobile station 13 and the applicable portal 35 will include a presence status notification from the mobile station 13 to the portal. The presence information in the initial notice could be enhanced with location information, e.g. based on a prior location fix; but for purposes of this example, the location information is provided in a subsequent update procedure. Hence, in this example, the network session set-up, IM log-in and initial presence notification can be implemented in a conventional matter, and those operations are omitted from the call flow for convenience.

Figure 3:
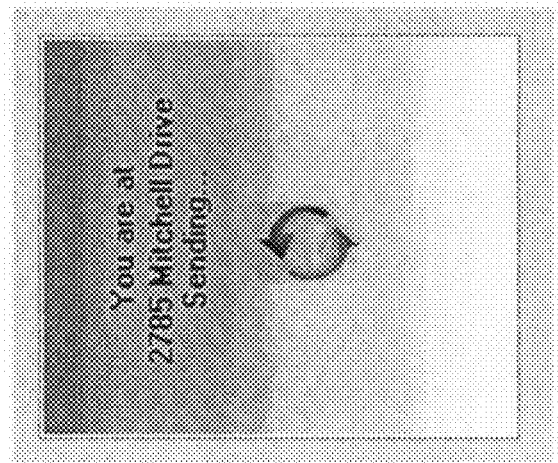
FIG. 3 depicts an example of an options menu, as may displayed on a mobile station during a portion of the call flow.
Figure 4:
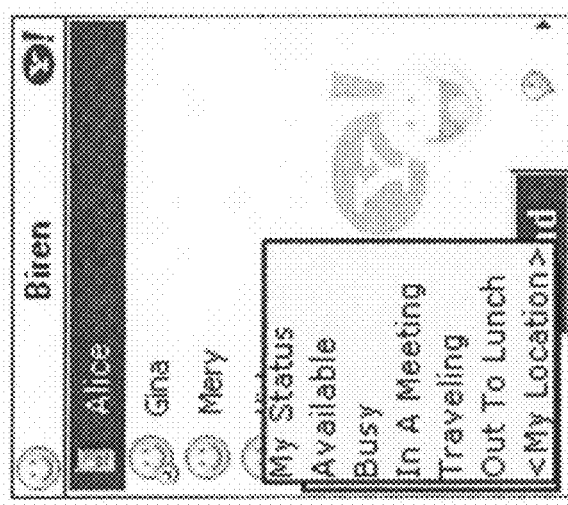
FIG. 4 depicts an example of a "My Status Menu," as may displayed on a mobile station during a portion of the call flow.

In the first illustrated step (S1) of the call flow, the IM user selects "My Status" from the IM application screen displayed on the mobile station; and then the user selects "<My Location>" from the screen, after being signed on through the MIM client. FIG. 3 depicts an example of the options menu that an IM application might display on the screen of the mobile station 13. As shown, the options include a "My Status" option, which the user selects by operation of the user interface of the particular type of mobile station 13. In response, microprocessor execution of the MIM client 14 causes the mobile station 13 to display a status menu, for example, in the manner depicted in FIG. 4. As shown, one of the items available under the status menu is "<My Location>", which the user selects by operation of the user interface of the mobile station 13. Of course, a variety of other techniques may be used to provide interaction with the user allowing the user to operate mobile station 13 in a manner to indicate a desire to add location information to the presence information for the mobile IM service.

Returning to the call flow of FIG. 2, in step S2, the microprocessor executing the MIM client 14 in the mobile station 13 responds to the user selection of "<My Location>" by making an authentication request to the Location Proxy Server (LPS) 41, using ILpsPosDet (an LPS Brew extension). Effectively, the mobile station 13 transmits the message over the air-link and through the RAN 15, the PDSN 23 and the data network 25, to the computer platform running the LPS server programming. The LPS 41 authenticates the mobile station 13 for access to location based services offered by the network 11. Assuming that the mobile station 13 is successfully authenticated, the LPS 41 returns the IP address of the Positioning Determination Entity (PDE) 31 to the mobile station 13; and at the same time, the LPS 41 sends the mobile directory number (MDN) of the station 13 and indicates valid duration that the mobile station 13 is available to be located to the PDE 37 (shown as two legs of step S3 in the drawing).

In step S4, the MIM client 14 running in the mobile station 13 uses the IP address of the PDE 37 (received from the LPS) to communicate with the computer platform running the PDE server programming. Specifically, the mobile station sends a message over the air-link and through the RAN 15, the PDSN 23 and the data network 25, to the PDE 37. This message indicates the mobile station's MDN, which the PDE checks against the MDN it received from the LPS 41 in step S3. The mobile station 13 can identify the cell site through which the mobile station is currently receiving service from information that the BTS 17 broadcasts throughout the cell coverage area, and the MIM client 14 includes the cell site identification in the message sent at S4 to the PDE 37.

The example implements assisted GPS processing, to determine the current location of the mobile station 13. As part of the assistance, the mobile station 13 receives ephemeris data for its approximate location, corresponding to the identified cell site, from the network 11. Hence, in the exemplary call flow, at step S5 the PDE 37 returns the satellite ephemeris data to the client in the mobile station 13.

The microprocessor executing the MIM client 14 now directs the mobile station 13 to take multiple satellite pseudorange measurements, using the satellite ephemeris data received from the PDE 37. If the mobile station 13 has sufficient GPS processing capabilities, it may determine a final fix using these pseudorange measurements, to obtain latitude, longitude and possibly altitude for the current location of the mobile station 13. In an assisted mode, the mobile station 13 would send the pseudorange measurement data to the PDE 37, and the PDE 37 processes the data to determine the coordinates for the final fix. The PDE 37 would provide the coordinates to the mobile station 13, either directly or via the LPS 41.

In the process flow of FIG. 2, assume now that the MIM client 14 in the mobile station 13 has the latitude and longitude coordinates of the current location of the mobile station 13. Hence, in step S6, execution of the MIM client 14 causes the microprocessor to control the mobile station 13 to send the coordinates through the network 11 to the LPS 41. The GIS module within the LPS 41 translates the latitude and longitude coordinates into text for the address coordinates of the current location of the mobile station 13; and at step S7, the LPS 41 returns the location address of the mobile station 13 and thus to the MIM client 14 running in the mobile station.

In step S8, the MIM client in the mobile station 13 populates the location information automatically into the presence status data for the IM user. Execution of the MIM client 14 then causes the mobile station 13 to send (in step S9) the presence status information, including the determined user location, to the IM gateway 27 in an update message; and the IM gateway 27 in turn passes the message through the Internet 26 to the appropriate IM portal server, that is to say to portal 35 in our example (at S10).

Figure 6:
FIG. 6 depicts an instant messaging program window showing status of parties on a contact list, as might be displayed on a user's desktop PC.

After step S10, the IM portal server 35 provides notification of the user's presence to all IM users who have requested to see the user's status, e.g. to various other IM user's who have this user identified in their respective contact lists or are on the user's contact list. The distributed presence data includes the information as to this user's current location, and the other IM users receiving the presence notification are then able to see the user's location. FIG. 6 depicts an example of an IM window as might be displayed on the desktop of another user's PC 28 following receipt of the update notification. As shown, the window includes the address for contact "Biren," that is to say the same address as returned to the user of the mobile station 13 and shown in the progress display of FIG. 5 in our example.

As shown by the discussion above, particularly that of FIGS. 2-6, presence status is automatically populated with user's location and sent to the IM gateway and portal. All the user has to do is to select <My Location> from the appropriate menu via the user interface. The MIM client may offer an alternative option for the user to manually type in his/her current location.

The concept of obtaining the location dynamically and populating it into a text field can also be extended other text entry fields. For example, <My Location> can be a quick text entry so that the user can send it in an actual IM message. However, the client processing still eliminates the need for the user to find the location and type a lengthy address on a mobile device.

In addition to the above use cases, the general idea can be applied to other uses, such as the following use cases:
1. Find a contact—find the location of an IM contact.
   a. User A requests User B's location
   b. User B receives authorization request
   c. User B accepts authorization request
   d. MIM client on User B's handset sends an Authentication Request to LPS
   e. LPS gives PDE IP Address to the MIM client on User B's handset
   f. MIM client on User B's handset gives MDN and Cell Site Info to the PDE
   g. PDE provides Satellite Ephemeris data to MIM client
   h. MIM client determines Lat/Long using LBS API
   i. MIM client gives Lat/Long to IM Server
   j. IM Server geo codes Lat/Long to an Address
   k. IM Server sends Address to User A
2. Find contacts near me—find IM contacts that are within a certain radius from user's current location.
   a. IM users opt-in to publish their location information to IM Server
   b. User A requests to find other IM contacts near him
   c. MIM client on User A's handset sends an Authentication Request to LPS
   d. LPS gives PDE IP Address to the MIM client on User A's handset
   e. MIM client on User A's handset gives MDN and Cell Site Info to the PDE
   f. PDE provides Satellite Ephemeris data to MIM client
   g. MIM client determines Lat/Long using LBS API
   h. MIM client gives Lat/Long to IM Server
   i. IM Server uses User A's geo coordinates to find other contacts within X miles radius
   j. IM Server returns a list of contacts near User A
3. Send location to a map BOT—send user's current location, e.g., "here", to a map BOT provided by an ISP to get driving directions, etc.
   a. User A would like to send his location
   b. MIM client on User A's handset sends an Authentication Request to LPS
   c. LPS gives PDE IP Address to the MIM client on User A's handset
   d. MIM client on User A's handset gives MDN and Cell Site Info to the PDE
   e. PDE provides Satellite Ephemeris data to MIM client
   f. MIM client determines Lat/Long using LBS API
   g. MIM client makes a request to LPS to translate Lat/Long to Address
   h. MIM client sends the Address to the map BOT It will be readily apparent that operations described above may be carried out by execution of programming code in the form of software, firmware, or microcode running on controllers of mobile stations or other programmable processor devices of mobile user terminals of any type and/or by processing of relevant data on such programmable devices. The software functionalities involve programming, including executable code as well as associated stored data, for causing the mobile station to implement the location and IM related functions, as exemplified by the discussions above. Code for implementing the location operations in relation to IM communications may be in the form of computer or microcontroller instruction in any form (e.g. source code, object code, interpreted code, etc.) stored in or carried by any computer or machine-readable medium. In operation, the executable code is stored within the respective mobile station. At other times, however, the programming may be stored at other locations and/or transported for loading into respective equipment, e.g. into the particular mobile station from a server or the like.

Hence, implementations of the teachings presented herein typically involve one or more software products in the form of one or more modules of executable code and/or data carried by at least one tangible, non-transitory type of machine readable storage medium. Execution of such code by a processor or the like of a mobile station causes the station for example to implement steps such as outlined above in the discussion of the call flow of FIG. 2, to determine position, obtain corresponding address data and send the address data in a presence update message to the appropriate IM portal server for distribution.

As used herein, terms such as computer or machine "readable storage medium" refer to any tangible non-transitory medium that participates in providing instructions and/or data to a processor. Such a medium may take many forms, including non-volatile storage media volatile and storage media. Non-volatile media include, for example, optical or magnetic disks, such as flash memory of the mobile station of FIG. 6 as well as storage devices in any server or computer(s), switches or routers that may be used to store programming for downloading into mobile stations. Volatile media include dynamic memory, such as RAM in the mobile station or main memory of a computer platform of a mobile PC or of a program server.

Many of these forms of computer readable media may be involved in carrying one or more sequences of one or more instructions to a processor for storage and/or execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2-3rd Generation Partnership Project 2
API—Application Programming Interface
BREW—Binary Runtime Environment for Wireless
BS—Base Station
BTS—Base Transceiver System
CDMA—Code Division Multiple Access
EVDO—Evolution Data Optimized standard
GIS—Geographic Information System
GPS—Global Positioning System
GSM—Global System for Mobile communication standard
IM—Instant Messaging
IP—Internet Protocol
IR—Infrared
ISP—Internet Service Provider
LBS—Location Based Service
LPS—Location Proxy Server
MDN—Mobile Directory Number
MIM—Mobile Instant Messaging
MPC—Mobile Positioning Center
MS—Mobile Station
MSC—Mobile Switching Center
PC—Personal Computer
PDE—Position Determining Entity
PDSN—Packet Data Serving Node
PN—Pseudo Noise
RAM—Random Access Memory
RAN—Radio Access Network
RF—Radio Frequency
TDMA—time division multiple access
UPc—User Privacy Component
XLS—XML for Location Services protocol
XML—Extensible Markup Language

What is claimed is:

1. A method of automatically adding user location information to instant messaging from a mobile station of a user, comprising mobile station implemented steps of:
   detecting a user selection of a location related instant messaging function of a mobile instant messaging (MIM) client on the mobile station;
   responsive to the detected user selection of the location related instant messaging function of the MIM client, sending a request for authentication of the mobile station to access location based service, from the mobile station of the user through a mobile wireless communication network to a location proxy server (LPS);
   receiving a network address of a position determining entity (PDE) from the location proxy server, responsive to authentication of the mobile station in response to the request, through the mobile wireless communication network at the mobile station;
   using the network address, communicating with the PDE through the mobile wireless communication network, to obtain Global Positioning System (GPS) satellite assistance information;
   using the GPS assistance information to take a measurement of a signal from one or more GPS satellites at the mobile station and determine therefrom geographic coordinates of a current location of the mobile station;
   transmitting the geographic coordinates from the mobile station through the mobile wireless communication network to the LPS;
   receiving through the mobile wireless communication network at the mobile station, from the LPS, a text address for the current location of the mobile station corresponding to the geographic coordinates;
   executing the MIM client on the mobile station to automatically populate the received text address into a message for an instant messaging service; and
   transmitting the message for the instant messaging service, from the mobile station through the mobile wireless communication network.

2. The method of claim 1, wherein:
   the message is a presence status message; and
   the step of transmitting the message comprises transmitting the presence status message to an instant messaging portal server for distribution of presence status including the text of the address to one or more other instant messaging users.

3. The method of claim 1, wherein:
   the message is an instant message; and
   the step of transmitting the message comprises transmitting the instant message through the wireless communication network to another instant messaging user.

4. A product comprising:
   a tangible, non-transitory machine readable storage medium; and
   a program including a mobile instant messaging (MIM) client, for execution by a processor of a mobile station of a user, embodied in the machine readable storage medium, wherein execution of the program by the processor causes the mobile station to perform functions comprising:
   detecting a user selection of a location related instant messaging function of the MIM client on the mobile station;
   responsive to the detected user selection of the location related instant messaging function of the MIM client, sending a request for authentication of the mobile station to access location based service, from the mobile station of the user through a mobile wireless communication network to a location proxy server (LPS);
   receiving a network address of a position determining entity (PDE) from the location proxy server, responsive to authentication of the mobile station in response to the request, through the mobile wireless communication network at the mobile station;
   using the network address, communicating with the PDE through the mobile wireless communication network, to obtain Global Positioning System (GPS) satellite assistance information;

using the GPS assistance information to take a measurement of a signal from one or more GPS satellites at the mobile station and determine therefrom geographic coordinates of a current location of the mobile station;

transmitting the geographic coordinates from the mobile station through the mobile wireless communication network to the LPS;

receiving through the mobile wireless communication network at the mobile station, from the LPS, a text address for the current location of the mobile station corresponding to the geographic coordinates;

executing the MIM client on the mobile station to automatically populating populate the received text address into a message for an instant messaging service; and transmitting the message for the instant messaging service from the mobile station through the mobile wireless communication network.

5. A mobile station for communication through a mobile wireless communication network, comprising:

a wireless transceiver for sending and receiving packet data over an airlink to and from the mobile wireless communication network;

a Global Positioning System (GPS) receiver;

a user input and a display, for providing a user interface;

a programmable controller coupled to the wireless transceiver, the user input and the display, for controlling operations of the transceiver and interacting with a user via the user interface;

a program memory storing programming for execution by the programmable controller; and a mobile instant messaging client program stored in the program memory, wherein execution of the mobile instant messaging client program causes the programmable controller to operate the mobile station to perform operations including:

(a) detecting a user selection of a location related instant messaging function of the mobile instant messaging client, (b) responsive to the detected user selection of the location related instant messaging function of the mobile instant messaging client, sending a request for authentication of the mobile station to access location based service, from the mobile station through the mobile wireless communication network to a location proxy server (LPS);

(c) receiving a network address of a position determining entity (PDE) from the location proxy server, responsive to authentication of the mobile station in response to the request, through the mobile wireless communication network at the mobile station;

(D) using the network address, communicating with the PDE through the mobile wireless communication network, to obtain Global Positioning System (GPS) satellite assistance information;

(e) using the GPS assistance information to take a measurement of a signal from one or more GPS satellites at the mobile station and determine therefrom geographic coordinates of a current location of the mobile station;

(f) transmitting the geographic coordinates from the mobile station through the mobile wireless communication network to the LPS;

(g) receiving through the mobile wireless communication network at the mobile station, from the LPS, a text address for the current location of the mobile station corresponding to the geographic coordinates;

(h) automatically populating the received text address into a message for an instant messaging service; and (i) transmitting the message for the instant messaging service from the mobile station through the mobile wireless communication network.

* * * * *